(12) United States Patent
Karaoguz et al.

(10) Patent No.: US 7,260,379 B2
(45) Date of Patent: *Aug. 21, 2007

(54) APPARATUS FOR CONTROLLING AND MONITORING A WIRELESS HOTSPOT THROUGH AN INTERFACE WITH A CELLULAR TELEPHONE NETWORK

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/095,610

(22) Filed: Apr. 1, 2005

(65) Prior Publication Data

US 2005/0181760 A1    Aug. 18, 2005

Related U.S. Application Data

(63) Continuation of application No. 10/314,311, filed on Dec. 9, 2002, now Pat. No. 6,885,859.

(51) Int. Cl.
*H04M 11/00* (2006.01)
(52) U.S. Cl. ............... 455/408; 455/422.1; 455/426.2; 455/432.3; 455/456.2
(58) Field of Classification Search ............... 455/304, 455/405–408, 411, 414.1, 422.1, 426.1, 432.2–3, 455/426.2, 435.1, 424, 436, 414.4, 456.1–2, 455/456.5
See application file for complete search history.

(56) References Cited

U.S. PATENT DOCUMENTS

| | | | |
|---|---|---|---|
| 5,761,425 A * | 6/1998 | Miller | 709/218 |
| 5,790,548 A * | 8/1998 | Sistanizadeh et al. | 370/401 |
| 6,061,346 A * | 5/2000 | Nordman | 370/352 |
| 6,256,498 B1 * | 7/2001 | Ludwig | 455/433 |
| 6,317,421 B1 * | 11/2001 | Wilhelmsson et al. | 370/328 |
| 6,389,008 B1 * | 5/2002 | Lupien et al. | 370/352 |
| 6,535,726 B1 | 3/2003 | Johnson | |
| 2002/0191575 A1 | 12/2002 | Kalavade et al. | |
| 2003/0051041 A1 | 3/2003 | Kalavade et al. | |
| 2003/0182431 A1 | 9/2003 | Sturniolo et al. | |
| 2004/0037255 A1 * | 2/2004 | Joong et al. | 370/338 |
| 2004/0133806 A1 * | 7/2004 | Joong et al. | 713/201 |

OTHER PUBLICATIONS

"IEEE 802.11, A Technical Overview," Pablo Brenner, BreezeNet website, Jul. 8, 1997, www.sss-mag.com/pdf/80211p.pdf.

(Continued)

*Primary Examiner*—Binh K. Tieu
(74) *Attorney, Agent, or Firm*—Squire, Sanders & Dempsey L.L.P.

(57) ABSTRACT

A process of controlling and monitoring a wireless hotspot by a wireless service provider is disclosed. Data is received from an access point of a wireless hotspot for wireless portable devices and is translated into wireless network data having a format intelligible by a wireless service provider. The wireless network data is sent to the wireless service provider and wireless service provider data is received from the wireless service provider. The wireless service provider data is translated into access point data having a format intelligible by the access point and the access point data is forwarded to the access point.

24 Claims, 6 Drawing Sheets

OTHER PUBLICATIONS

Donny Jackson, Telephony, Ultrawideband May Thwart 802.11, Bluetooth Efforts, PRIMEDIA Business Magazines & Media Inc., Feb. 11, 2002.

Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Dr. Robert J. Fontana, "A Brief History of UWB Communications," Multispectral.com, Multispectral Solutions, Inc., www.multispectral.com/history.html, Aug. 20, 2002.

Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.

Dr. Terence W. Barrett, "History of UltraWideband (UWB) Radar & Communications: Pioneers and Innovators," Proceedings and Progress in Electromagnetics Symposium 2000 (PIERS2000), Cambridge, MA, Jul. 2000.

Dr. Henning F. Harmuth, "An Early History of Nonsinusoidal Electromagnetic Technologies," Multispectral.com, Multispectral Solutions, Inc., www.multispectral.com/history.html, Aug. 20, 2002.

Rebecca Taylor, "Hello, 802.11b AND Bluetooth: Let's Not Be Stupid!", ImpartTech.com, www.ImportTech.com/802.11-bluetooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or Foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld.Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11b—Part 1, www.wilcoxonwireless.com/whitepapers/bluetoothvs802.doc, Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for Aug. 19, 2002 through Aug. 11, 2002, 80211b.weblogger.com/, Aug. 11-19, 2002.

"Wireless Ethernet Networking with 802.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHelp.com, Anomaly, Inc., www.homenethelp.com/web/diagram/access-point.asp, Aug. 20, 2002.

"Simple 802.11b Wireless Ethernet Network without an Access Point," HomeNetHelp.com, Anomaly, Inc., www.homenethelp.com/web/diagram/ad-hoc.asp, Aug. 20, 2002.

"Cable/DSL Router with Wired and Wireless Ethernet Built In," HomeNetHelp.com, Anomaly, Inc., www.homenethelp.com/web/diagram/share-router-wireless.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"Wireless Access Point (802.11b) of the Router Variety," HomeNetHelp.com, Anomaly, Inc., www.homenethelp.com/web/diagram/share-wireless-ap.asp, Aug. 20, 2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven J. Vaughan-Nichols, "Ultrawideband Wants to Rule Wireless Networking," TechUpdate.ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB?", PulseLink.net, Pulse~LINK, Inc., www.pulselink.net/ov_history.html, Sep. 4. 2002.

Robert X. Cringely, "The 100 Mile-Per-Gallon Carburetor—How Ultra Wide Band May (or May Not) Change the World," InterestingPeople.org, Jan. 26, 2002.

William A. Kissick, Editor, "The Temporal and Spectral Characteristics of Ultrawideband Signals," NTIA Report 01-383, Jan. 2001, www.its.bldrdoc.gov/pub/ntia-rpt/01-383/.

"Ultra Wide Band," www.ida.gov.sg/Website/IDAContent.nsf/dd1521fle79ecf3bc825682f0045a349/1856626048baf403c82569880267e26%3FOpenDocument+%22Full+duplex+UWB+handheldtransceiver%22&hl=en&ie=UTF-8, Aug. 20, 2002.

\* cited by examiner

APPARATUS FOR CONTROLLING AND MONITORING A WIRELESS HOTSPOT THROUGH AN INTERFACE WITH A CELLULAR TELEPHONE NETWORK

REFERENCE TO RELATED APPLICATIONS

This application is a continuation of U.S. application Ser. No. 10/314,311, entitled "Apparatus for Controlling and Monitoring a Wireless Hot Spot Through an Interface with a Cellular Telephone Network," filed Dec. 9, 2002 now U.S. Pat. No. 6,885,859 The subject matter of this earlier filed application is hereby incorporated by reference.

BACKGROUND OF THE INVENTION

1. Field of the Invention

The present invention relates to devices and networks that utilize wireless computer networks and methods of controlling the operation of wireless computer networks. The present invention further relates to methods and networks that allow for a wireless hotspot location to be controlled and monitored through an interface with a wireless telephone network. Additionally, the present invention also simplifies the process by a wireless telephone provider to open wireless hotspots to better serve customers of wireless computer networks.

2. Description of Related Art

The emergence of wireless hotspots has increased the mobility of wireless users and allowed mobile users to access resources without requiring a physical connection to a main network. Many of these wireless hotspots have appeared in many locations, including coffee shops and libraries, and allow users with wireless communication equipment to be connected. These locations that provide the access do so to attract customers or, as in the case of libraries, because they see such access as an extension of their public interest. However, the equipment, monitoring and access services are not free and the provider of the hotspot has to bear the burden of those expenses. As an example, a T-1 digital connection can cost approximately $1000 per month at 2002 rates to provide such a level of service. If the expansion of wireless hotspots is to continue so that they become ubiquitous, one possibility is for the persons using the hotspots should take up some portion of the costs.

In addition, there is also a "chicken or the egg" type problem with wireless access. While the number of users of wireless devices is not high, establishments do not generally have any incentive to provide wireless service for a small number of users. Similarly, while the number of establishments offering wireless services is small, users of the wireless devices don't not generally have any incentive to sign up for those services if they are available in only a few places. One entity that has an incentive to expand the use of wireless devices, such as laptop computers and mobile multimedia gateways, is an entity, such as a wireless telephone service provider, that already provides wireless telephone service to the users. Thus, wireless telephone services may have an incentive to make general wireless devices as ubiquitous as wireless telephones are in 2002.

However, there are impediments to expanding the services for wireless devices that a wireless telephone service provider does not face in expanding their services provided to wireless telephone users. In expanding services to wireless telephone users, the wireless telephone service provider merely provides the number of base stations or installs picocells in areas where reception needs to be improved. However, expanding the coverage of areas providing hotspot network access is not a simple matter of providing those hotspots because the nature of the services provided by the hotspots is different from that of wireless telephone service provider. The interface to wireless telephone handsets and verification and billing of users is quite different.

As such, there is a need for a method or mechanism that can provide for a wireless hotspot location to be controlled and monitored through an interface with a wireless telephone network. In addition, there is also a need for a system and method that expand the locations of hotspots and allow for their control and monitoring without changing the network infrastructure of wireless telephone service provider.

SUMMARY OF THE INVENTION

This invention seeks to overcome the drawbacks of the above-described conventional network devices and methods. The present invention is directed to providing for a wireless hotspot location to be controlled and monitored through an interface with a wireless telephone network. In addition, the present invention also provides for systems and methods that expand the locations of hotspots and allow for their control and monitoring without changing the network infrastructure of wireless telephone service provider.

According to one aspect of this invention, a process of controlling and monitoring a wireless hotspot by a wireless service provider is disclosed. Data is received from an access point of a wireless hotspot for wireless portable devices and is translated into wireless network data having a format intelligible by a wireless service provider. The wireless network data is sent to the wireless service provider and wireless service provider data is received from the wireless service provider. The wireless service provider data is translated into access point data having a format intelligible by the access point and the access point data is forwarded to the access point.

Alternatively, the wireless service provider may be a wireless telephone service provider and wireless telephone service provider data is received from the wireless telephone service provider. Also, the wireless telephone service provider may be a cellular telephone service provider. The data received from the access point may be data related to one of a number of users of the wireless hotspot, identifiers for the users of the wireless hotspots, authorization information for the portable devices, the bandwidth used by the portable devices through the access point and types of services utilized by users of the wireless hotspot.

The process may include the step of sending the wireless network data to the wireless service provider that is related to one of authentication information, usage time information, billing data and disconnection data for users of the wireless hotspot. Also, the data received from the wireless hotspot may be data related to short-range data received by the access point from the portable devices, where that short-range data have a format of one of an IEEE 802.11 format, IEEE 802.15.3 format, an ultra wideband format and a short-range wireless communication standard format.

According to another embodiment of the invention, a system for controlling and monitoring a wireless hotspot by a wireless service provider is disclosed. The system includes first receiving means for receiving data from an access point of a wireless hotspot for wireless portable devices, first translating means for translating the data from the access point into wireless network data having a format intelligible by a wireless service provider and sending means for sending the wireless network data to the wireless service provider. The system also includes second receiving means for receiving wireless service provider data from the wireless service provider, second translating means for translating the wireless service provider data into access point data having a format intelligible by the access point and forwarding means for forwarding the access point data to the access point.

In another embodiment, an interface system for controlling and monitoring a wireless hotspot by a wireless service provider is disclosed. The Interface system includes an access point data processor, configured to send access point data to an access point of a wireless hotspot for wireless portable devices and to receive access point data from the access point. The interface system also includes a translating unit, in communication with said access point data processor, configured to translate the access point data from the access point into wireless network data having a format intelligible by a wireless service provider and configured to translate wireless network data into access point data having a format intelligible by the access point. Additionally, the interface system includes a communication unit, in communication with said translation unit, configured to send wireless network data to the wireless service provider and to receive wireless network data from the wireless service provider.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention provides a solution to the above-described and other problems by supplying an interface between the wireless hotspot and the existing wireless telephone network. The interface collects data from the access point coordinator and translates that data into a format that is readily understood by the wireless telephone network. The benefits are that users can be authenticated and billed and services can be monitored through the existing wireless telephone network. The interface frees the proprietors of the wireless hotspots from the burden of setting up, maintaining and monitoring the functions of the wireless hotspot and allows the wireless telephone network provider to provide service that is fully compatible with existing services.

The process of creating incentives for wireless access may be carried out by different candidates that seek to benefit from the expansion of wireless services. One candidate for offering these services is landline or wireless telephone providers, where those providers already provide cellular, landline and other wireless telephone data services to their users. Following a similar model as that used for mobile telephones, access to wireless hotspots can be coordinated through wireless telephone service providers, with the wireless telephone service providers assisting in authenticating of users, monitoring of usage, and billing of users.

Another candidate for offering wireless hotspot services would be a third party that supplies services to the wireless hotspot locations, provides authentication of users and processes and forwards billing information to billing party. In one embodiment of the present invention, the third party would provide the interface between the hotspots and a corporation with which the user of the hotspot has an account. The third party could be a telephone company or a wireless telephone company or some other service provider. In such an embodiment, the third party may provide the interface between the hotspot and its own infrastructure.

Figure 1:
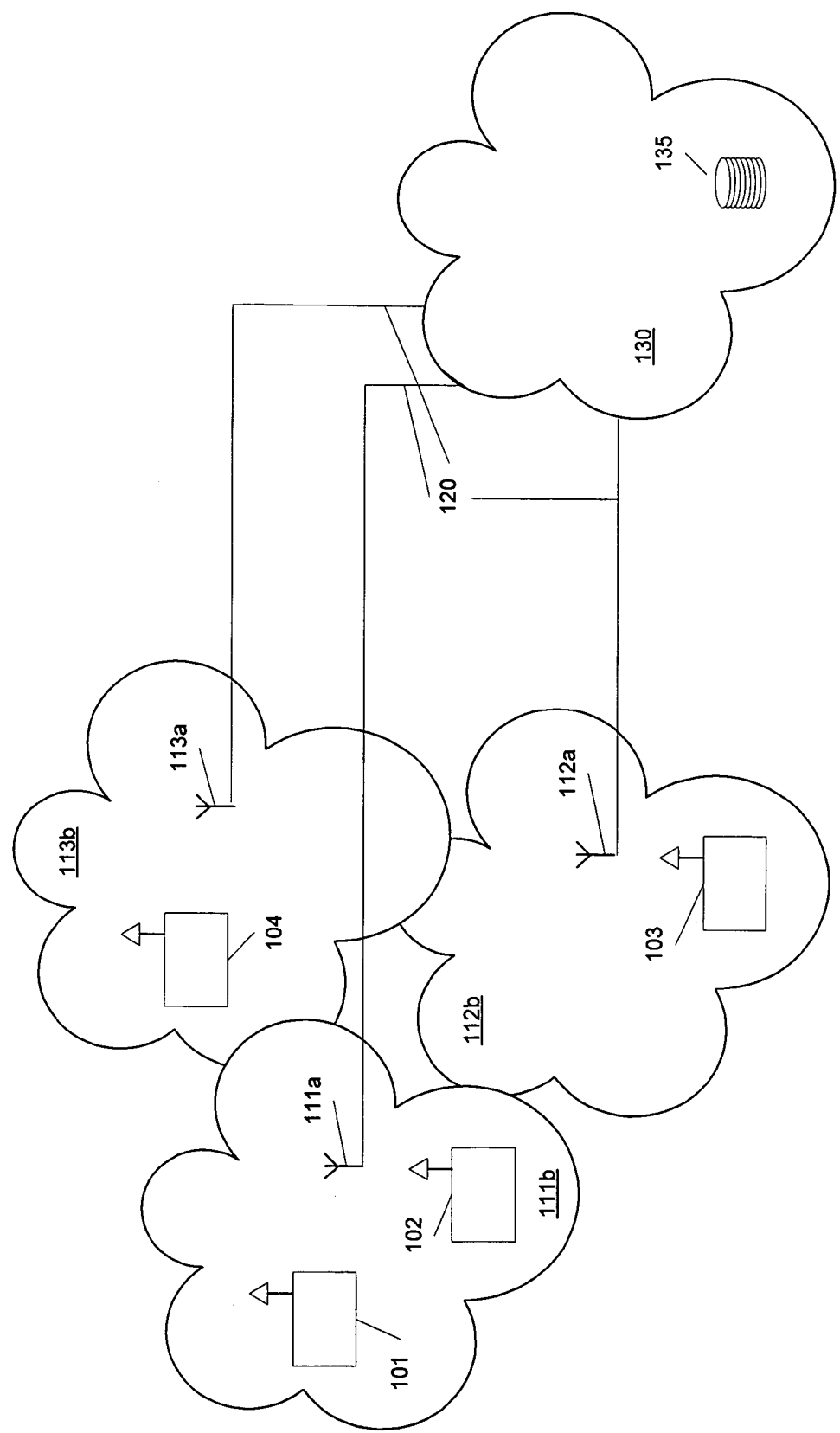
FIG. 1 is a schematic representation of a wireless telephone system having multiple cells, according to one embodiment of the present invention.

One example of a general cellular telephone network is illustrated in FIG. 1. Multiple cells 111b, 112b and 113b are established through the use of antennas 111a, 112a and 113a. Devices 101-104 having access to the cellular telephone network are able to move from cell to cell and maintain access with the network. Each antenna 111a-113a has a connection 120 with a service provider 130. The service provider 130 controls access to the network and coordinates the handing-off of access as the devices pass between the cells. The service provider identifies each device and routes communication to the proper location of the particular device. Commonly, the devices 101-104 may be cellular telephones, computers with wireless modems and other devices that exchange information with the service provider.

Figure 5:
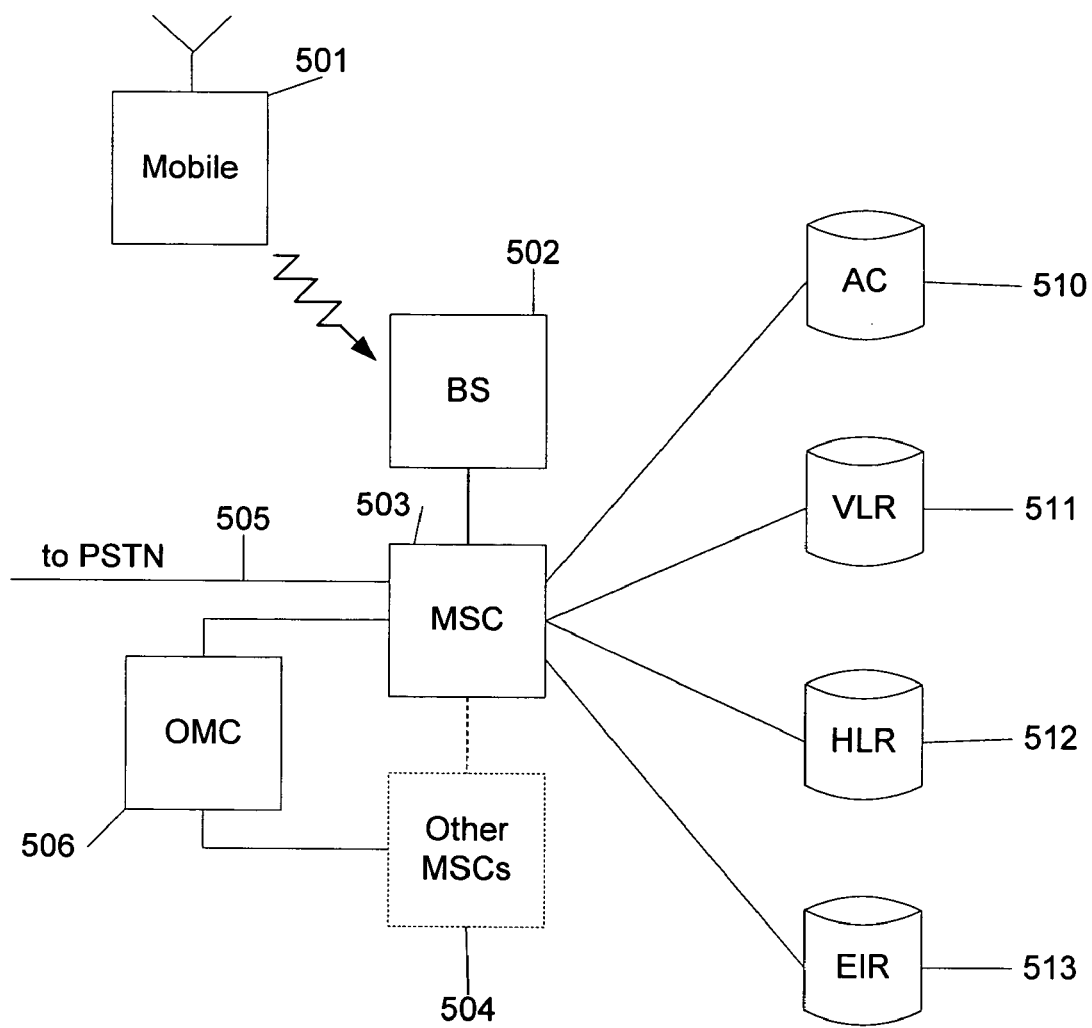
FIG. 5 illustrates a portion of a wireless telephone network, according to one embodiment of the present invention.

With respect to the wireless telephone service provider, a general view of an infrastructure of the service provider is illustrated in FIG. 5. A mobile unit 501 communicates with a base station 502. The base station acts as a high-capacity switch which provides total overview and control of radio functions, such as handover, management of radio network resources and handling of cell configuration data. There are multiple base stations in a cell network and those base stations react and coordinate with a mobile switching center 503. The overall network may have multiple mobile switching centers, where all of the centers are connected to the operation maintenance center 506. In either case, the mobile switch center interacts with distant databases and the public switched telephone network or PSTN 505. It checks that a customer has a valid account before letting a call go through, delivers subscriber services like Caller ID, and pages the mobile unit 501 when a call comes in. These databases, for example, might include the home Location Register (HLR) 512, the Visited Location Register (VLR) 511, the Authentication Center (AC) 510, and the Equipment Identity Register (EIR) 513.

Figure 2:
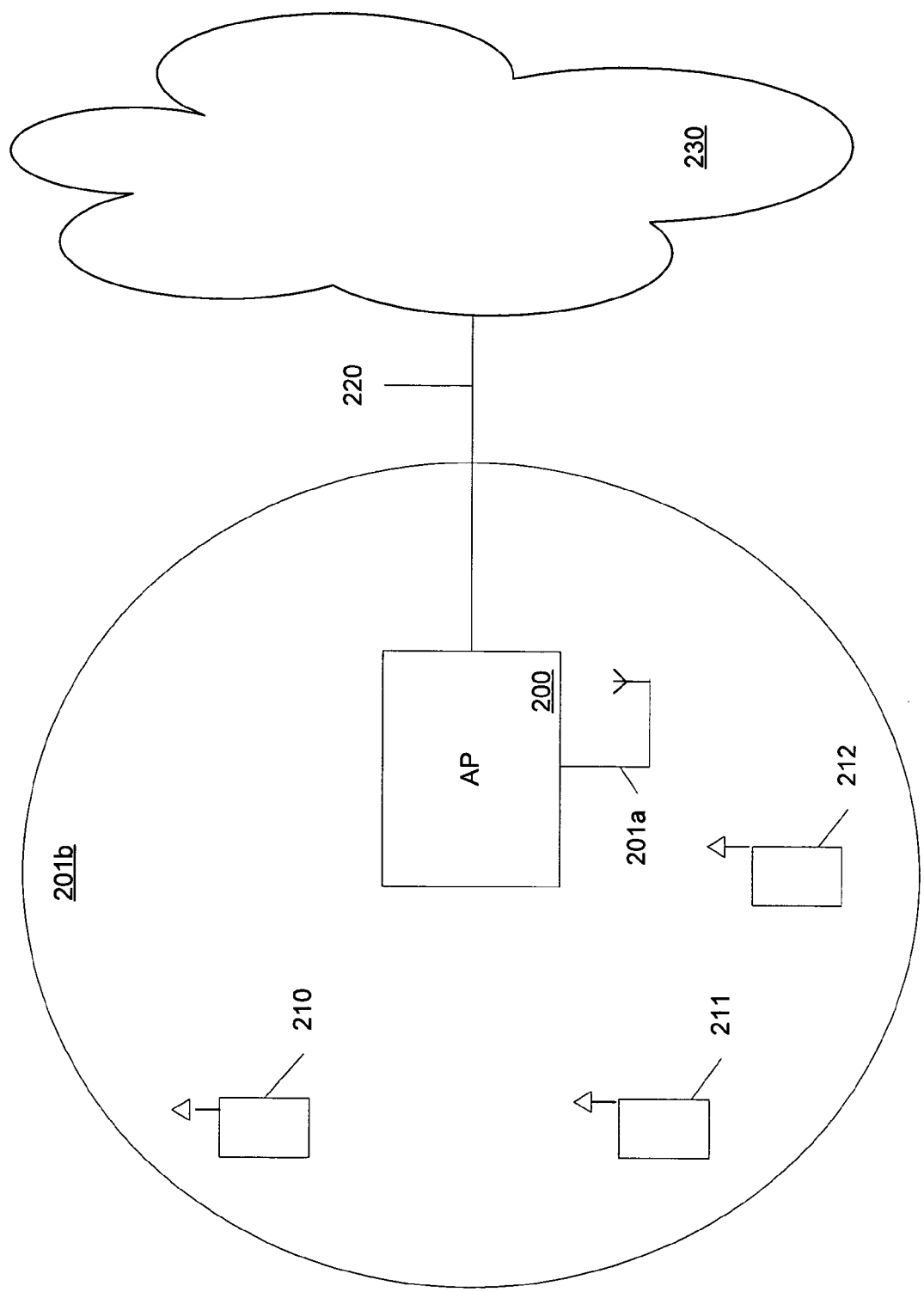
FIG. 2 illustrates a schematic representation of a wireless hotspot with an access point and several wireless devices, according to one embodiment of the present invention.

A general wireless hotspot installation is illustrated in FIG. 2. The hotspot is controlled through an access point 200, with the access point having an antenna 201a to establish a wireless access zone 201b. The wireless access may be made through an IEEE 802.11 standard local area network (LAN) or some other type of wireless network. Devices 210-212 within the hotspot are able to communicate with the larger network 230 through communication with the access point 200. The access point 200 communicates through a link 220 with the larger network 230 and the access point acts to mediate communication between the devices 210-212 and the larger network and between the devices themselves. As examples, the devices 210-212 may be computers equipped with 802.11 access cards, personal data assistants enabled for wireless access and cellular telephones having multiple means for wireless access. The larger network may be the Internet or some private wide area network.

Figure 3:
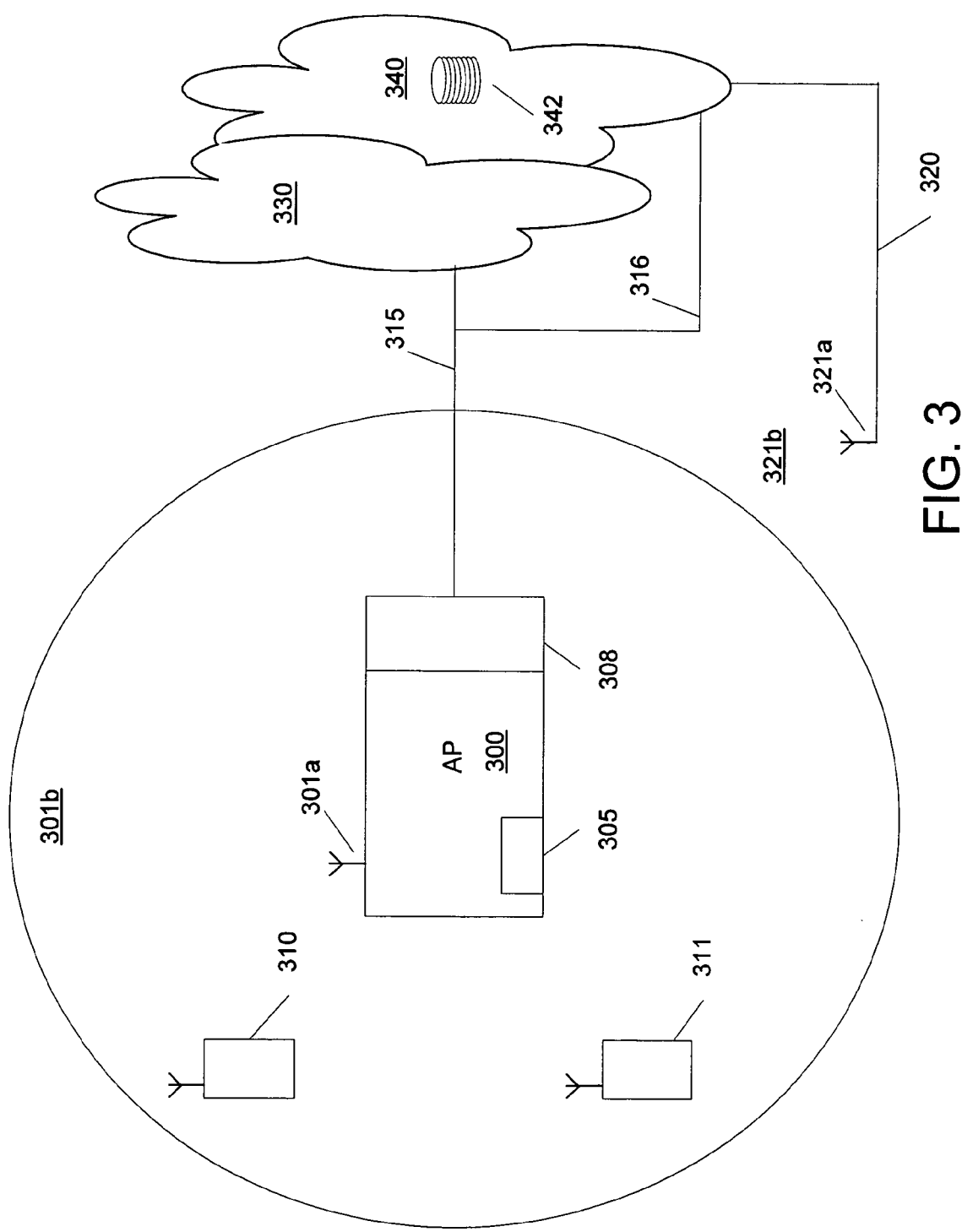
FIG. 3 illustrates a schematic of a wireless hotspot with connections to different network entities, according to an embodiment of the present invention.

FIG. 3 illustrates one embodiment of the present invention. A wireless hotspot is illustrated, with the coverage of the hotspot set by the access point 300 through an antenna 301a, the range of the hotspot is illustrated by the range 301b. Devices 310 and 311 within the range 301b may potentially establish a connection with the hotspot. The access to the access point is controlled through the access controller 305, that may be hardware, firmware, software or a combination thereof. A communication connection 315 is established between the access point 300 and the larger network 330.

Also illustrated in FIG. 3 is the wireless telephone service provider 340. The service provider 340 contains a database 342 of users of the wireless telephone network that is discussed in more detail above. The service provider provides services through an antenna 321a, through a connection 320, to provide a coverage area 321b. The coverage area 321b for the wireless telephone service may also include some or all of the wireless hotspot range 301b. The wireless telephone service provider 340 is also connected to the interface 308, that appears to the wireless telephone service provider to be a base station for wireless telephone service.

Figure 4:
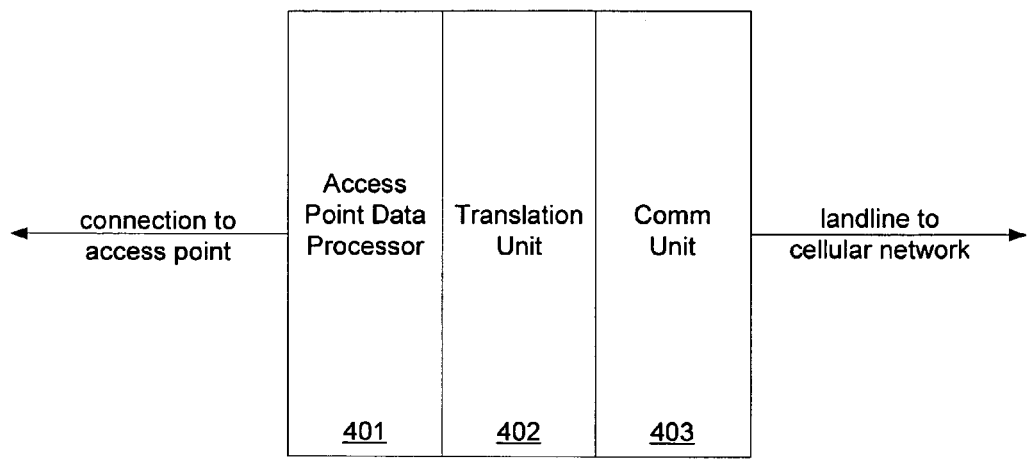
FIG. 4 provides a schematic representation of an interface system between the wireless hotspot and the wireless telephone network, according to one embodiment of the present invention.

The interface 308 is illustrated in further detail in FIG. 4. The interface unit has an access point data processor 401 that is connected to the access point coordinating access to the wireless hotspot. The access point data processor 401 receives the data and parses it to provide the relevant portions to the translation unit 402. After the translation unit has provided the translated data to the communication unit 403, it is sent to the wireless telephone network. The format of the data is such that the wireless telephone network views the hotspot as a base station.

The type of data format exchanged in the cellular telephone network is different from the type of data format exchanged in an 802.11 network. One format for cellular networks is the General Packet Radio Service (GPRS), a standard for wireless communication that runs at speeds up to 115 kbits per second, which can be compared with Global System for Mobile Communications (GSM) systems having 9.6 kilobit per second speed. GPRS, which supports a wide range of bandwidths, is an efficient use of limited bandwidth and is particularly suited for sending and receiving small bursts of data, such as e-mail and Web browsing, as well as large volumes of data.

The IEEE 802.11 standard refers to a family of specifications developed by the IEEE for wireless LAN technology. 802.11 specifies an over-the-air interface between a wireless client and a base station or between two wireless clients. The general standard applies to wireless LANs and provides 1 or 2 Mbps transmission in the 2.4 GHz band using either frequency hopping spread spectrum (FHSS) or direct sequence spread spectrum (DSSS). 802.11a is an extension to 802.11 that provides up to 54 Mbps in the 5 GHz band and uses an orthogonal frequency division multiplexing encoding scheme rather than FHSS or DSSS. 802.11b, also referred to as 802.11 High Rate or Wi-Fi, is an extension to 802.11 that provides 11 Mbps transmission (with a fallback to 5.5, 2 and 1 Mbps) in the 2.4 GHz band and uses only DSSS. Another extension to the general standard is 802.11 g that also applies to wireless LANs and provides 20+ Mbps in the 2.4 GHz band.

Also, the data exchanged with the wireless hotspot by the portable device may also be via at least one of an IEEE 802.15.3 format, a BLUETOOTH™, short-range wireless communication standard, format and an ultra wideband format. In cases where these data sent to the access point of the hotspot have one of the above forms and requires access to or information from the wireless telephone service provider, the interface unit of the present invention would also provide translation of those requests to the wireless telephone service provider. Such a situation may occur where the shorter range data exchange formats require authentication or authorization by the wireless telephone service provider.

One benefit of the present invention is that it can mimic a cell of the cellular network. This allows a proprietor of the wireless hotspot to merely install a hot spot cell and the wireless telephone network is able to gather all the information that it needs. Such an ability is important because it allows for the wireless telephone service providers to offer wireless hotspot services without changing out software used to monitor and control the wireless telephone network.

Figure 6:
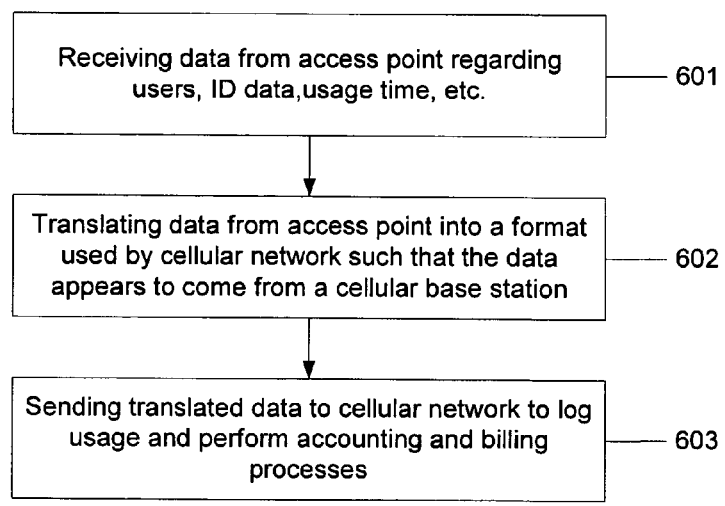
FIG. 6 illustrates a flowchart of a process of monitoring and controlling a wireless hotspot, according to one embodiment of the present invention.

The general process performed by the interface unit is illustrated in FIG. 6, according to one embodiment of the present invention. The interface unit receives data from the access point from the access point regarding the number of users, identifying information for the users, usage time, bandwidth used, etc, in step 603. The received data is translated into a format used by the wireless telephone network in 602. This may include authenticating information, responses to queries from the wireless telephone network and information regarding users that have disconnected from the wireless hotspot. In step 603, the translated data is sent to the wireless telephone network so that the network can process that data. The translated data is received by the mobile switching center 603 and is processed based on the type of data transmitted.

Figure 7:
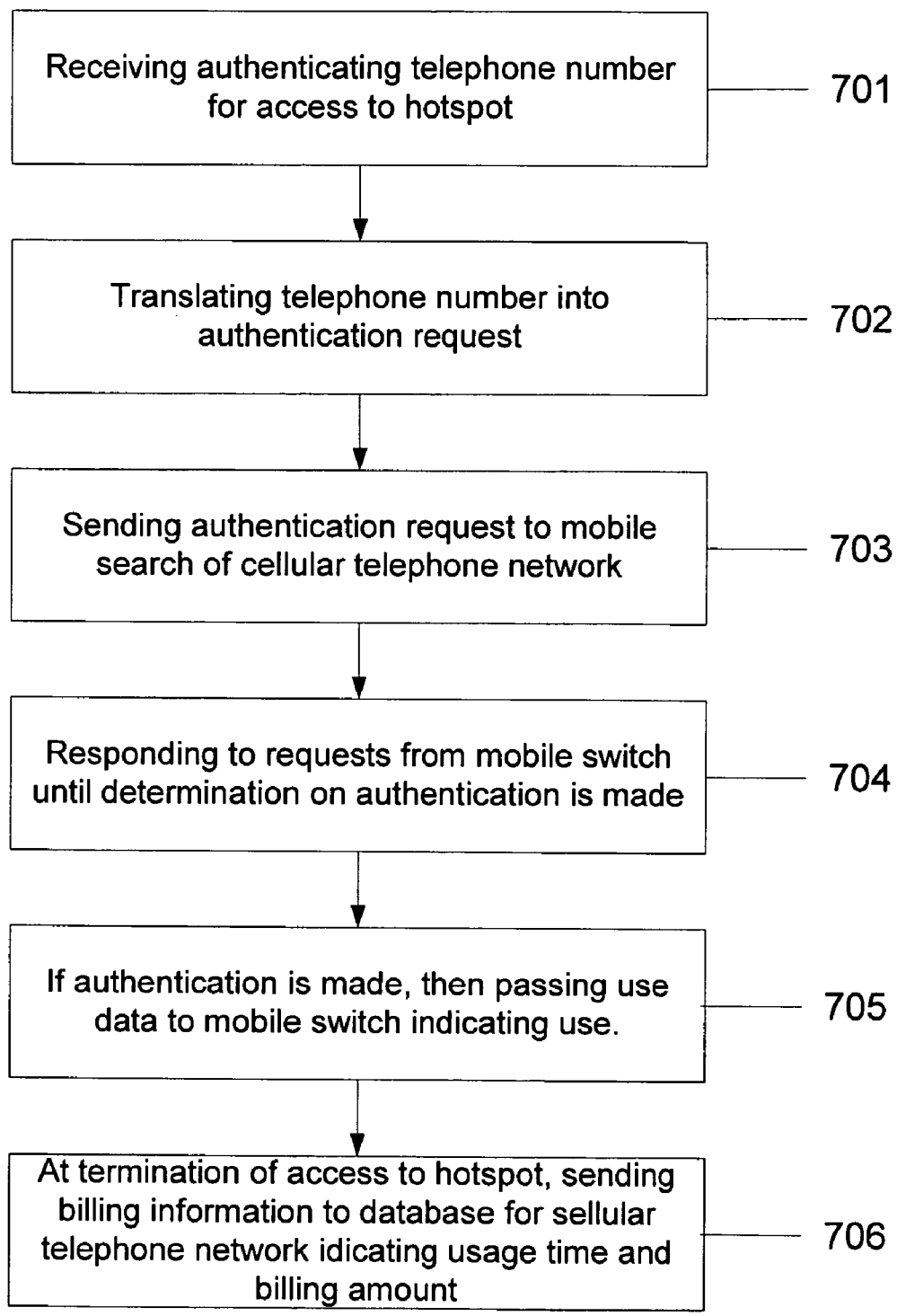
FIG. 7 illustrates a flowchart of the process of monitoring and controlling a wireless hotspot, according to one embodiment of this invention.

According to another aspect of the present invention, the general process of logging onto a wireless hotspot using the interface unit of the present invention is described in FIG. 7. An authenticating telephone number is received from a potential user of the wireless hotspot 701 and the telephone number and other information received is translated into an authentication request 702. The authentication request has the same format as the request that comes from a mobile unit to a base station and is passed onto the mobile switching center. The authentication request is sent to the mobile switching center of the cellular network 703 and the interface waits for a response. The interface unit responds to requests from the mobile switching center until a determination on authentication is made 704. If the user is authenticated, then the interface unit will pass translated data detailing use of the wireless hotspot 705. At the termination of access to the wireless hotspot, billing information for the account of the user is sent to the cellular telephone network indicating usage time and billing amount.

It is noted that the present application is directed, at least in part, to wireless hotspots. The use of the term wireless hotspot or hotspot is applicable to any wireless access point. The term wireless hotspot or hotspot, as used in the specification and claims, should not be construed to be limited to a single type of locale or be construed as providing access according to only a particular wireless access format, such as the IEEE 802.11 standard. It would also be within the scope of the invention to implement the disclosed elements of the invention in discrete electronic components, thereby taking advantage of the functional aspects of the invention. Additionally, the present invention can be implemented totally or partially through software.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of controlling and monitoring a wireless hotspot by a wireless service provider, said process comprising:
    translating data from an access point of a wireless hotspot into wireless network data having a format intelligible by a wireless service provider;
    receiving wireless service provider data from the wireless service provider;
    translating the wireless service provider data into access point data having a format intelligible by the access point; and
    forwarding the access point data to the access point.

2. A process as recited in claim 1, wherein the wireless service provider comprises a wireless telephone service provider and wherein said step of receiving wireless service provider data from the wireless service provider comprises receiving wireless telephone service provider data from the wireless telephone service provider.

3. A process as recited in claim 2, wherein the wireless telephone service provider comprises a cellular telephone service provider.

4. A process as recited in claim 1, further comprising receiving the data from the access point wherein the data is related to one of a number of users of the wireless hotspot, identifiers for the users of the wireless hotspots, authorization information for the portable devices, the bandwidth used by the portable devices through the access point and types of services utilized by users of the wireless hotspot.

5. A process as recited in claim 4, wherein said step of receiving the data from the access point comprises receiving wireless telephone number data from one of the users of the wireless hotspot, for providing authorization access to the one of the users of the wireless hotspot.

6. A process as recited in claim 1, further comprising sending the wireless network data to the wireless service provider, wherein the wireless network data is related to one of authentication information, usage time information, billing data and disconnection data for users of the wireless hotspot.

7. A process as recited in claim 1, further comprising receiving the data from the access point by receiving short-range data received by the access point from wireless portable devices.

8. A process as recited in claim 7, wherein said short-range data comprises data having a format of one of an IEEE 802.11 format, an IEEE 802.15.3 format, an ultra wideband format and a short-range wireless communication standard format.

9. A system for controlling and monitoring a wireless hotspot by a wireless service provider, the system comprising:
    first translating means for translating data from an access point into wireless network data having a format intelligible by a wireless service provider;
    receiving means for receiving wireless service provider data from the wireless service provider;
    second translating means for translating the wireless service provider data into access point data having a format intelligible by the access point; and
    forwarding means for forwarding the access point data to the access point.

10. A system as recited in claim 9, wherein the wireless service provider comprises a wireless telephone service provider and wherein said second receiving means comprises third receiving means for receiving wireless telephone service provider data from the wireless telephone service provider.

11. A system as recited in claim 10, wherein the wireless telephone service provider comprises a cellular telephone service provider.

12. A system as recited in claim 9, further comprising another receiving means for receiving data related to one of a number of users of the wireless hotspot, identifiers for the users of the wireless hotspots, authorization information for the portable devices, the bandwidth used by the portable devices through the access point and types of services utilized by users of the wireless hotspot.

13. A system as recited in claim 12, wherein said another receiving means comprises sub-receiving means for receiving wireless telephone number data from one of the users of the wireless hotspot, for providing authorization access to the one of the users of the wireless hotspot.

14. A system as recited in claim 9, further comprising sending means for sending data related to one of authentication information, usage time information, billing data and disconnection data for users of the wireless hotspot.

15. A system as recited in claim 9, further comprising another receiving means for receiving short-range data received by the access point from wireless portable devices.

16. A system as recited in claim 15, wherein said short-range data comprises data having a format of one of an IEEE 802.11 format, an IEEE 802.15.3 format, an ultra wideband format and a short-range wireless communication standard format.

17. An interface system for controlling and monitoring a wireless hotspot by a wireless service provider, the interface system comprising:
    a translating unit configured to translate access point data from an access point of a wireless hotspot into wireless network data having a format intelligible by a wireless service provider and configured to translate the wireless network data into the access point data having a format intelligible by the access point; and
    a communication unit, in communication with said translation unit, configured to send the wireless network data to the wireless service provider and to receive the wireless network data from the wireless service provider.

18. An interface system as recited in claim 17, wherein the wireless service provider comprises a wireless telephone service provider.

19. An interface system as recited in claim 18, wherein the wireless telephone service provider comprises a cellular telephone service provider.

20. An interface system as recited in claim 17, wherein the access point data comprises data related to one of a number of users of the wireless hotspot, identifiers for the users of the wireless hotspots, authorization information for the portable devices, the bandwidth used by the portable devices through the access point and types of services utilized by users of the wireless hotspot.

21. An interface system as recited in claim 20, wherein the access point data comprises wireless telephone number data from one of the users of the wireless hotspot, for providing authorization access to the one of the users of the wireless hotspot.

22. An interface system as recited in claim 17, wherein the wireless network data comprises data related to one of authentication information, usage time information, billing data and disconnection data for users of the wireless hotspot.

23. An interface system as recited in claim 17, wherein the access point data comprises data related to short-range data received by the access point from the portable devices.

24. An interface system as recited in claim 23, wherein said short-range data comprises data having a format of one of an IEEE 802.11 format, an IEEE 802.15.3 format, an ultra wideband format and a short-range wireless communication standard format.

* * * * *